(12) United States Patent (10) Patent No.: US 9,391,970 B2
Branam et al. (45) Date of Patent: Jul. 12, 2016

(54) METHODS, SYSTEMS, AND COMPUTER PROGRAM PRODUCTS FOR PROVIDING MEDIA MANAGEMENT

(71) Applicant: BellSouth Intellectual Property Corporation, Wilmington, DE (US)

(72) Inventors: Michael Branam, Lawrenceville, GA (US); Akbar Pirani, Marietta, GA (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 0 days.

(21) Appl. No.: 14/200,379

(22) Filed: Mar. 7, 2014

(65) Prior Publication Data

US 2014/0189817 A1 Jul. 3, 2014

Related U.S. Application Data

(63) Continuation of application No. 11/744,975, filed on May 7, 2007, now Pat. No. 8,671,210.

(51) Int. Cl.

| | |
|---|---|
| G06F 15/16 | (2006.01) |
| H04L 29/06 | (2006.01) |
| H04N 7/173 | (2011.01) |
| H04N 21/2187 | (2011.01) |
| H04N 21/2743 | (2011.01) |
| H04N 21/4223 | (2011.01) |
| H04N 21/61 | (2011.01) |
| H04N 21/6379 | (2011.01) |
| H04N 21/6408 | (2011.01) |
| H04N 21/643 | (2011.01) |

(52) U.S. Cl.
CPC .............. *H04L 63/08* (2013.01); *H04L 65/601* (2013.01); *H04L 65/607* (2013.01); *H04N 7/17318* (2013.01); *H04N 21/2187* (2013.01); *H04N 21/2743* (2013.01); *H04N 21/4223* (2013.01); *H04N 21/6125* (2013.01); *H04N 21/6379* (2013.01); *H04N 21/6408* (2013.01); *H04N 21/64322* (2013.01)

(58) Field of Classification Search
None
See application file for complete search history.

(56) References Cited

U.S. PATENT DOCUMENTS

| | | | |
|---|---|---|---|
| 5,675,752 | A | 10/1997 | Scott et al. |
| 6,606,303 | B1 | 8/2003 | Hassel et al. |
| 6,647,417 | B1 | 11/2003 | Hunter et al. |
| 6,760,916 | B2 | 7/2004 | Holtz et al. |
| 6,834,110 | B1 | 12/2004 | Marconcini et al. |
| 7,133,687 | B1 | 11/2006 | El-Fishawy et al. |
| 7,444,593 | B1 | 10/2008 | Reid |
| 7,603,458 | B1 | 10/2009 | Sexton et al. |

(Continued)

OTHER PUBLICATIONS

U.S. Appl. No. 14/311,787; Notice of Allowance; filed Jun. 23, 2014; Date Mailed: Jun. 25, 2015; 13 pages.

*Primary Examiner* — Afshawn Towfighi
(74) *Attorney, Agent, or Firm* — Cantor Colburn LLP

(57) ABSTRACT

Providing media management services includes creating an account record for a first user of the media management services, allocating a first storage space to the first user that is accessible to the first user via user credentials assigned to the first user, creating an account record for a second user of the media management services, and allocating a second storage space to the second user that is accessible to the second user via user credentials assigned to the second user. The media management services also include sharing the second storage space with the first user based on a device identifier of a media recording device that is common to both the first account record and the second account record.

14 Claims, 9 Drawing Sheets

(56) References Cited

U.S. PATENT DOCUMENTS

| | | |
|---|---|---|
| 7,702,782 B1 | 4/2010 | Pai |
| 2002/0038456 A1 | 3/2002 | Hansen et al. |
| 2002/0067744 A1 | 6/2002 | Fujll et al. |
| 2002/0070982 A1 | 6/2002 | Hill et al. |
| 2002/0073328 A1* | 6/2002 | Daniels ............... G06F 21/6218 726/27 |
| 2002/0184451 A1 | 12/2002 | Dovi |
| 2003/0135464 A1 | 7/2003 | Mourad et al. |
| 2003/0222819 A1 | 12/2003 | Karr et al. |
| 2004/0158573 A1 | 8/2004 | Bradley et al. |
| 2004/0210930 A1 | 10/2004 | Cullinan et al. |
| 2005/0015805 A1 | 1/2005 | Iwamura |
| 2005/0034106 A1 | 2/2005 | Kornerup et al. |
| 2005/0183120 A1 | 8/2005 | Jain et al. |
| 2005/0223041 A1 | 10/2005 | Yoshimine et al. |
| 2006/0112188 A1 | 5/2006 | Albanese et al. |
| 2006/0153018 A1 | 7/2006 | Dumont |
| 2006/0171684 A1 | 8/2006 | Fukuda et al. |
| 2006/0182412 A1 | 8/2006 | Lefevre |
| 2006/0195548 A1 | 8/2006 | Hunter et al. |
| 2006/0224761 A1 | 10/2006 | Howarth et al. |
| 2007/0013515 A1 | 1/2007 | Johnson et al. |
| 2007/0026371 A1 | 2/2007 | Wood |
| 2007/0097147 A1 | 5/2007 | Inata et al. |
| 2007/0124789 A1 | 5/2007 | Sachson et al. |
| 2007/0150484 A1* | 6/2007 | Funge et al. .................... 707/10 |
| 2007/0183329 A1 | 8/2007 | Elwell |
| 2007/0201823 A1 | 8/2007 | Kang |
| 2008/0008456 A1 | 1/2008 | Buttars et al. |
| 2008/0120306 A1 | 5/2008 | Panabaker et al. |
| 2008/0134235 A1* | 6/2008 | Kalaboukis .................... 725/32 |
| 2008/0216142 A1 | 9/2008 | Goldberg et al. |
| 2008/0219658 A1 | 9/2008 | Keane et al. |
| 2008/0270913 A1 | 10/2008 | Singer et al. |
| 2008/0281951 A1 | 11/2008 | Branam et al. |
| 2008/0281977 A1 | 11/2008 | Branam et al. |
| 2008/0282191 A1 | 11/2008 | Branam et al. |
| 2008/0288562 A1 | 11/2008 | Weir et al. |
| 2009/0154665 A1 | 6/2009 | Galvin et al. |
| 2009/0271687 A1 | 10/2009 | Lee et al. |
| 2014/0115475 A1 | 4/2014 | Vallone et al. |
| 2014/0157335 A1 | 6/2014 | Hicks et al. |
| 2015/0065044 A1 | 3/2015 | Dua |

\* cited by examiner

METHODS, SYSTEMS, AND COMPUTER PROGRAM PRODUCTS FOR PROVIDING MEDIA MANAGEMENT

CROSS-REFERENCE TO RELATED APPLICATIONS

This application is a continuation of U.S. patent application Ser. No. 11/744,975, filed on May 7, 2007. This application is related to commonly assigned U.S. patent application Ser. No. 11/744,981, entitled METHODS, SYSTEMS, AND COMPUTER PROGRAM PRODUCTS FOR PROVIDING CENTRALIZED MANAGEMENT AND DELIVERY SERVICES FOR MEDIA CONTENT, filed on May 7, 2007. This application is also related to commonly assigned U.S. patent application Ser. No. 11/744,970, entitled METHODS, DEVICES, SYSTEMS, AND COMPUTER PROGRAM PRODUCTS FOR MANAGING AND DELIVERING MEDIA CONTENT, filed on May 7, 2007. Each of the above-referenced applications is incorporated by reference herein in its entirety.

BACKGROUND

The present application relates generally to media delivery, and more particularly, to methods, systems, and computer program products for providing media management services.

Present devices allow for the capture of personal media that may be distributed via a variety of methods. Many of the current methods available for distributing personal media rely upon a device that requires a target viewer to utilize a personal computer to access a network (e.g., Internet). These current methods generally require several steps to implement. For example, a digital image is captured by a camera in its internal memory and subsequently transferred to storage on a personal computer. The digital image may then be retrieved from storage for viewing or transmitted electronically to designated recipients (e.g., via an email attachment). Alternatively, a digital image may be uploaded to a web site from a user's personal computer for long-term storage. One example of this is where a network storage service provider enables customers to upload their digital images, organize or categorize the images in some meaningful way, and retrieve the images as desired, and/or provide access to the images by other network users.

Video images, such as video content captured by a personal video recorder may be stored in a storage medium within the video recorder and later transferred to a computer or other display device for viewing. Thus, many of the current methods available provide distribution of the media subsequent to its capture and storage upon a storage device that is independent and distinct from the device which originally captured the media.

BRIEF SUMMARY

Exemplary embodiments include methods, systems, and computer program products for providing media management services. A method includes creating an account record for a first user of the media management services, allocating a first storage space to the first user that is accessible to the first user via user credentials assigned to the first user, creating an account record for a second user of the media management services, and allocating a second storage space to the second user that is accessible to the second user via user credentials assigned to the second user. The media management services also include sharing the second storage space with the first user based on a device identifier of a media recording device that is common to both the first account record and the second account record.

Other systems, methods, and/or computer program products according to embodiments will be or become apparent to one with skill in the art upon review of the following drawings and detailed description. It is intended that all such additional systems, methods, and/or computer program products be included within this description, be within the scope of the exemplary embodiments, and be protected by the accompanying claims.

BRIEF DESCRIPTION OF DRAWINGS

Referring now to the drawings wherein like elements are numbered alike in the several FIGURES.

The detailed description explains the exemplary embodiments, together with advantages and features, by way of example with reference to the drawings.

DETAILED DESCRIPTION OF EXEMPLARY EMBODIMENTS

Media management and delivery systems, devices, methods, and computer program products are provided in exemplary embodiments. In one embodiment, a host system provides centralized media management services including storage management and delivery of media content to a target receiving device. In another embodiment, a media recording device includes features for enabling the delivery and management of media content. In a further embodiment, a media recording device includes features to enable the delivery of near real-time media content.

Figure 1:
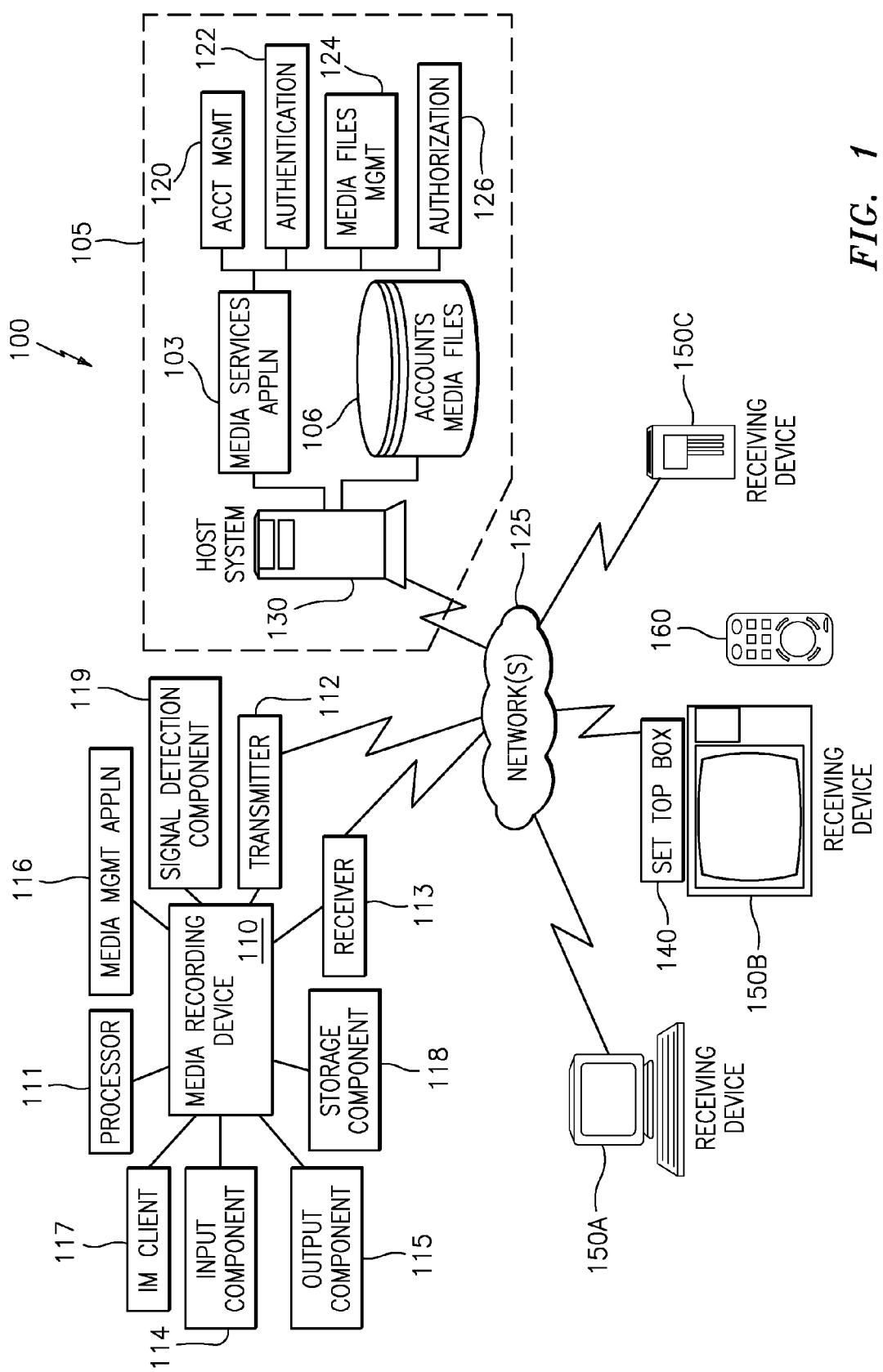
FIG. 1 is a block diagram of a media file management system in exemplary embodiments.

Referring now to FIG. 1, a media file management system 100 will now be described in exemplary embodiments. The media file management system 100 includes a media recording device 110 configured to capture a media file by a user, and a media services system 105 in communication with the media recording device 110 via one or more networks 125 (referred to herein as "network"). As used herein, the term "media file" shall refer to any representation of media content, such as a transmitted or stored audio signal, video signal, or image signal, for example. In exemplary embodiments, the media file is a video media file. In another embodiment, the media file is a near real-time video media file. As used herein, the term "near-real time" shall refer to a nearly contemporaneous transmission and delivery of the media file, and that such delivery may include small delays as a result of transfer among multiple transmission paths, and confirmation of appropriate access authorization, as will be discussed further below.

In exemplary embodiments, the media services system 105 further includes a host system 130 in communication with the network 125. The host system 130 executes a media services application 103 for storing, managing, and distributing media files as described further herein. In exemplary embodiments, host system 130 may be implemented using any suitable high-speed microprocessor capable of handling the volume of activities provided by the features and functions of the media services system 105. Host system 130 may be accessed over the network 125 and may further include a security feature or firewall (not shown) in order to protect the integrity of the data stored within the media services system 105. Other security features are described further herein. In addition to the media management services described herein, the media services application 103 also includes an accounts management component 120, an authentication component 122, a media files management component 124, and an authorization component 126. The account management component 120 administers media management accounts (accounts) on behalf of various users. For example, the account management component 120 may be tasked with provisioning users, or groups of users (e.g., a family) with the services made available through the media management services described herein, which are further managed through account records established for each user or group of users. In addition, media devices associated with these users may be managed through the account management component 120. The authentication component 122 verifies the identities of users seeking to access or view media files. The media files management component 124 manages media file storage for account users. The authorization component 126 controls access to the host system 130 or to the storage component. These components 120-126 are described further herein.

The host system 130 is in communication with a storage device 106. Storage device 106 stores media files captured by media recording devices, account records of individuals that subscribe to the media management services provided by the host system 130, as well as related information. Network 125 may employ various wireless communications and transmissions protocols, such as personal communications service (PCS), WiFi, Ultrawideband, Bluetooth, and satellite transmission, as well as different wireline protocols, such as telephone communications, cable communications and power line communications, to name a few. In exemplary embodiments, the host system 130 includes a location address, e.g., a uniform resource locator (URL), to make it available to any media file receiving device (e.g., media file receiving devices 150A-150C) that has capability to access the network 125.

For purposes of illustration, media file receiving device 150A is a general-purpose computer, media file receiving device 150B is a television, and media file receiving device 150C is a mobile wireless media player (e.g., MP3 player). These devices are also referred to herein as "receiving devices." In exemplary embodiments, each of receiving devices 150A-150C includes a network interface for enabling the respective receiving devices to communicate with the host system 130 and/or media recording device 110 over network 125. For example, the network interface of receiving device 150A may include a modem. Receiving device 150B may communicate over network 125 via an Internet Protocol-enabled set top box (STB) interface 140. Receiving device 150C may include a network card or similar means that enables communications over network 125.

While embodiments have been described having at least one of a television, a personal computer, and a mobile media player as receiving devices 150, it will be appreciated that the scope of the invention is not so limited, and that the invention may also apply to media file management systems that include other devices (e.g., cellular telephones, personal digital assistants, etc.) capable of accessing network 125, such as via a URL for example, and to display media files.

In exemplary embodiments, STB 140 is in communication with an interface device 160, such as a remote control, as one of many possible implementations, for example. The interface device 160 may be configured to allow entry of an access code for the selection of a personal channel. A personal channel may be a channel created by an account holder via the media services application 103. The personal channel may include a customizable selection of media files and media content that include one or more stored media files and near real-time media files. In exemplary embodiments, a display adapter on receiving devices 150A-150C may be configured to visually or audibly distinguish the availability of the stored media file from the near real-time media file. For example, live media files may be distinguished visually by applying characteristics, such as blinking or flashing, underlining, color or tone differences, etc.

It will be appreciated that the user of media recording device 110 may desire to limit, or restrict the access by others to the media file. This may be accomplished, e.g., by creating an authorization requirement to be associated with the media file. The authorization requirement may control to whom access to the media file is granted. In one exemplary embodiment, the authorization requirement is implemented by authorization settings provided via the authorization component 126. The authorization settings may specifically identify a target viewer (e.g., one or more of receiving devices 150A-150C) for which access to a media file may be granted. In another exemplary embodiment, the authorization requirement may be implemented by assigning an access code to a media file (e.g., via the authorization settings of component 126) and then forwarding the access code to a target viewer, e.g., by email. In exemplary embodiments, in response to the identity associated with the target viewer meeting the authorization requirement, the media recording device 110 is configured to make available to the receiving devices 150A-150C access to the media file via network 125. In another embodiment, a media services application 103 is configured to store and distribute the set of media files in accordance with the authorization requirement.

In exemplary embodiments, the host system 130, via media services application 103, is receptive of the media file, the authorization requirement, a request by the target viewer to access the media file, and the identity associated with the target viewer, and is configured to confirm that the identity associated with the target viewer meets the authorization requirement via, e.g., the authentication component 122 of the media services application 103. In response to confirming that the identity associated with the target viewer is in accordance with, or meets the authorization requirement associated with the media file, the host system 130 is configured to make available to the receiving devices 150A-150C access to the media file. In exemplary embodiments, the identity associated with the target viewer via the receiving device 150 is a globally unique identifier (GUID). The GUID is associated with, and uniquely identifies, the receiving device 150. Correspondingly, a target viewer may be identified via a receiving device GUID. Alternatively, the identity may be a MAC address, IP address, etc. It will be further appreciated that, in a similar fashion, an identity associated with the user may allow access by the user to a set of media files stored, e.g., in storage device 106 in accordance with the authorization requirement associated with the set of media files. Further, the identity associated with the user may define the personal channel into which the media files are stored, and may be assigned via the media recording device 110, as will be described further below.

In exemplary embodiments, the user may purchase or otherwise obtain an amount of storage space within the storage device 106 of host system 130 to be used for the storage of media files within the personal channel. In exemplary embodiments, access to the personal channel of the user may be granted to the target viewer following successful entry of an access code, e.g., via the interface device 160. In another embodiment, access to media files stored within the personal channel will be granted to the target viewer according to the authorization requirement associated with the media file and the identity associated with the target viewer via the receiving device 150.

The media recording device 110 includes a media recording structure as may be found in current media recording systems. The media recording device 110 further includes a computer processor 111 in communication with other components of the media recording device 110. In exemplary embodiments, the processor 111 executes a media management application 116 for facilitating the media management activities described herein.

In exemplary embodiments, the media recording device 110 further includes a transmitter 112 configured to transmit communication signals, including the media file, the authorization requirement associated with the media file, and the identity associated with the user. In exemplary embodiments, the transmitter 112 is configured to transmit the media file, the authorization requirement associated with the media file, and the identity associated with the user and/or target receiving device via a communications path, e.g., wireless or wireline network connection. In exemplary embodiments, the transmitter 112 is configured to transmit a near-real time media file to the network 125.

In exemplary embodiments, the media recording device 110 also includes a receiver 113, configured to receive communication signals, including media files that may be stored in storage device 106, as well as other communication signals.

While embodiments have been described with a media recording device 110 having a separate receiver 113 and transmitter 112, it will be appreciated that the scope of the embodiments is not so limited, and that the embodiments may also apply to media recording devices having other means to transmit and receive media files, such as a transceiver, for example.

In exemplary embodiments, a signal detection component 119 implemented by the media recording device 110 may be configured to determine and compare signal strengths of available networks (e.g., network within signaling range of the media recording device 110), and to select one of the available networks based upon that which has the stronger signal according to the signal strength comparison. The signal detection component 119 may be implemented using signal detection theory techniques (e.g., signal-to-noise ratio analysis) as will be appreciated by those skilled in the art. In exemplary embodiments, the media management application 116 is configured to select the connection based upon one of a number of criteria. For example, criteria for selecting a network for transmitting a media file may include: the connection manner that has the greater bandwidth capability, the connection manner that is able to provide the most efficient transfer of the media file, and that which is able to provide the transfer of the media file with the lowest service cost to the user. In exemplary embodiments, the media management application 116 is configured to assign the identity associated with the user of the media recording device 110.

In exemplary embodiments, the media recording device 110 further includes a user interface in communication with the media recording device 110. The user interface includes an input component 114 (e.g., a keyboard, data entry device, etc.) and an output component 115 (e.g., display screen, sound card, etc.). The user interface may be configured via the media management application 116 to display the media file, configuration settings related to the media recording device 110, and to be responsive to user input. In exemplary embodiments, the user interface is configured to allow user input of information related to the media file. For example, the user may utilize the user interface to create a title or descriptor related to the media file, so that the ease of subsequent identification of the media file may be enhanced, particularly among other media files that may be stored within the storage device 106 and/or media recording device 110. A descriptor provides information relating to the media file, such that the media file can be easily distinguished among other media files. The descriptor may be implemented as embedded content within the media file itself using, e.g., MPEG or other standards. In exemplary embodiments, the media recording device 110 is configured to communicate with the host system 130 via the transmitter 112 and the receiver 113. In exemplary embodiments, the output component 115 of the user interface is configured to display any media files stored in storage device 106 for which access has been granted to the identity associated with the user of the media recording device 110.

While embodiments of the media recording device 110 have been depicted having an integrated user interface, it will be appreciated that the scope of the embodiments is not so limited, and that the embodiments may also apply to media recording devices that are in communication with the user interface via other way, such as a user interface that is detached from the media recording device 110 and is in wireline or wireless communication with the media recording device 110, for example.

In exemplary embodiments, the media management application 116 is configured to assign a unique identity associated with the media recording device 110 that will be matched to the location address (e.g., URL) of the personal channel, or account associated with the user. However, it will be appreciated that it may be desirable to allow the user to assign, or change, the association between the media recording device 110 and the personal channel. For example, if the media recording device 110 is destroyed during a vacation, the user may quickly acquire a new media recording device 110, and appropriately enter the location address (e.g., URL) assignment via the user interface. As a second example, multiple users, having multiple location addresses (e.g., URLs) associated with multiple personal channels, may desire to share the same media recording device 110. As a third example, an amount of storage space within storage device 106 that is assigned to a particular personal channel may be shared and allocated among multiple users. In exemplary embodiments, the media management application 116 allows entry of an access code via the user interface, such as a user name and password combination, for example, to appropriately assign the association of the media recording device 110 with the corresponding personal channel.

In exemplary embodiments, media recording devices may be assigned to one account record (e.g., where one account includes one or more individuals and one or more media recording devices). In alternative exemplary embodiments, a single media recording device may be assigned to multiple users. The media account records may be configured to permit authorized account members to establish permissions with respect to the media management activities described herein. For example, a parent on an account may permit a junior account member to view media files stored in storage device 106 but not transmit media files.

While embodiments have been described using a combination of user name and password to assign the association of the media recording device 110, it will be appreciated that the scope of the embodiments is not so limited, and that the embodiments may also apply to media recording devices that may use other identification methods to assign the association of the media recording device to the personal channel, such as a fingerprint reader, and an iris scanner, for example.

It will be appreciated that a viewer of the media file (to whom access has been granted) may desire to communicate with the user of the media recording device 110 via a target receiving device (e.g., one of receiving devices 150A-150C). For example, a grandparent viewing a near real-time media file of a grandchild's sporting event may have a comment of encouragement to be passed on to the grandchild. In exemplary embodiments, the media recording device 110 further includes an instant messaging client 117 configured to receive and send instant messages via the transmitter 112 and the receiver 113. In exemplary embodiments, the user interface is configured to display and compose instant messages via the input component 114 and the output component 115. In exemplary embodiments, the receiver 113 is configured to make available to the instant messaging client 117 instant messages received by the media recording device 110 and the transmitter 112 is configured to transmit instant messages made available by the instant messaging client 117. In exemplary embodiments, at least one of the receiving devices 150A-150C include an instant messaging client (not shown) configured to make available instant messages between the media recording device 110 and a respective display component of the receiving devices via network 125.

Figure 10:
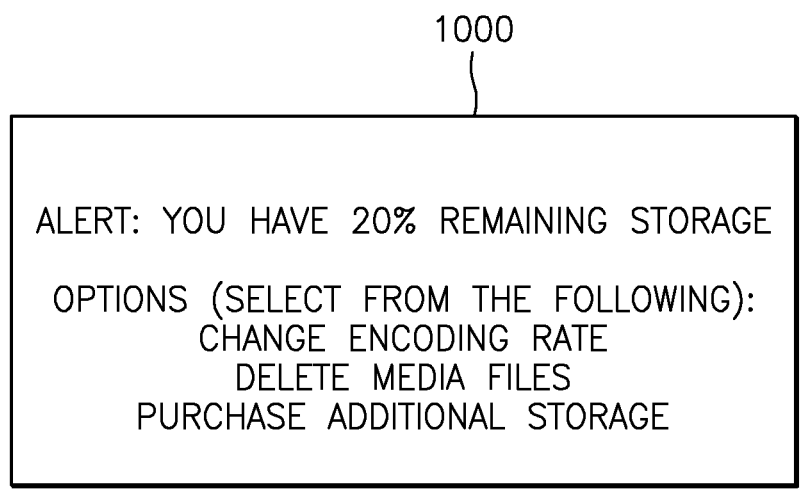
FIG. 10 is a display screen depicting a sample alert and related options provided by the media file management system in exemplary embodiments.

In exemplary embodiments, the media services application 103 manages the amount of storage space within storage device 106 that is assigned to the account of the user. It will be appreciated that as media files are transmitted from the media recording device 110 to the host system 130, an amount of remaining storage space available on the host system 130 may continue to decrease. In exemplary embodiments, media management application 116 is configured to receive information provided by the host system 130 related to the amount of remaining storage space, such as to alert the user to a diminishing amount of remaining storage space, for example. A sample alert is shown in FIG. 10. The receiver 113 is configured to make the alert available to the user via the output component 115 of the user interface. In exemplary embodiments, the alert is a display. In another embodiment, the alert is an instant message. In exemplary embodiments, the alert will notify the user of the amount of remaining storage space in the storage device 106. In exemplary embodiments, the alert will notify the user of an amount of time remaining that corresponds to an encoding rate at which the media file is currently being captured, as well as an amount of time remaining that corresponds to alternate encoding rates available for selection by the user.

In exemplary embodiments, subsequent to receipt of the alert, the media management application 116 allows the user, via the input component 114, to select a response to the alert regarding the diminishing amount of remaining storage space. The user may elect to continue making available the media file at the current encoding rate, which will effectively make no change in a duration of the media file that remaining amount of storage space can hold. The user may also elect to begin making available the media file at a reduced encoding rate, which will effectively increase the duration of the media file that the remaining amount of storage space can hold. The user may also elect to purchase an additional amount of storage space, thereby increasing the amount of assigned storage space as well as a length of time that the media file may be stored in storage device 106. In exemplary embodiments, the user will be able to purchase the additional amount of storage space via any device configured to access one of the personal channel and the Internet, such as a personal digital assistant, cell phone, personal computer, and set-top box, for example. The user may also elect to remove any of the set of media files stored in storage device 106, thereby increasing the amount of remaining storage space, as well as a duration of the media file that can be stored in storage device 106 of host system 130. In exemplary embodiments, the user may preview the media file prior to removal from the storage device 106 via the output component 115 of the user interface.

In exemplary embodiments, the user may select a default response to a shortage of remaining storage. In exemplary embodiments, the default response will include at least one of deleting media files based upon the file creation date, deleting media files based upon time elapsed subsequent to the last access date, deleting media files based upon the media file size, and deleting media files based upon a user assigned priority.

It will be appreciated that in some circumstances, the media recording device 110 may not be able to establish a connection with the host system 130 via the network 125. In exemplary embodiments, the media recording device 110 further includes a storage component 118 configured to store media files. In exemplary embodiments, the storage component of host system 130 is a magnetic media storage device, such as a hard disc drive, for example. In exemplary embodiments, the storage component 118 is a solid state storage device, including non-volatile solid state memory circuits. The storage component 118 allows the media file to be stored and subsequently transmitted to the host system 130 for storage and distribution.

While embodiments have been described having magnetic media or solid state storage devices, it will be appreciated that the scope of the embodiments is not so limited, and that the embodiments may also apply to media recording devices that have other devices configured to store media files.

In exemplary embodiments, the storage component 118 is configured to provide temporary storage of the near real-time media file prior to transmission to the network 125. Use of the temporary storage, often known as "caching" in the art, can provide time for the user to select the appropriate response following the alert notifying the user of the diminishing amount of remaining allocated storage space in storage device 106, as discussed above. Further, in exemplary embodiments, the user interface is configured to display the media files stored on the storage component 118 via the media management application 116.

In exemplary embodiments, the storage component 118 is configured to function as a server to store and distribute the media files, and may allow any of the receiving devices 150A-150C, absent a connection to the host system 130, to connect to the storage component 118 of the media recording device 110 via network 125. This is a connection type often known in the art as a peer-to-peer connection. In exemplary embodiments, the receiving device 150 is in communication with the network 125 and is configured to request access to the media files. In exemplary embodiments, the media management application 116 receives a request for access to any of the set media files stored in the storage component 118 from the receiving device 150 via receiver 113 and transceiver 120, absent connection through the host system 130. The media management application 116 confirms that the identity associated with the target viewer meets the authorization requirement, or to confirm the authorization of the request to access the media file. In exemplary embodiments, the confirmation of the authorization is performed by comparing a set of identities, defined by the authorization requirement, to whom access is granted, with the identity associated with target viewer originating the request. In response to confirmation of authorization of the request, the media management application 116 permits access, via the transmitter 112 and receiver 113 to the requested media file. It will be appreciated that a request for access to the media file may be made that has not been previously authorized for access, and that the user of the media recording device 110 may desire to grant such access. In exemplary embodiments, the user interface is configured to allow the user to provide authorization of the request that was not previously authorized.

In exemplary embodiments, the receiving devices 150A-15C are configured to display a media file library indicating a selection of media files that allows the target viewer to select one of the media files that are stored in storage device 106, the media files stored in the storage component 118, and the near-real time media file. In exemplary embodiments, the receiving devices 150 are configured to distinguish the selection of the media files stored in storage device 106, the media files stored in the storage component 118, and the near-real time media file. In exemplary embodiments, the receiving devices 150 are configured to distinguish the different media files via visual and/or audio attributes, such as color, intensity, and additional symbols, for example.

In exemplary embodiments, the personal channel may be configured to allow capture of the media file. For example, while the viewer is accessing the media file, they may also record a copy of the media file to a digital video recorder (DVR), and subsequently copy the media file to a digital video disc (DVD)/digital versatile disc (DVD) for subsequent viewing.

It will be appreciated that access to the media file may be commercially desirable. For example, if the user is located at a news-making event, target viewers may be willing to compensate the user for access to the media file. In exemplary embodiments, the user interface in conjunction with the media management application 116, the transmitter 112 and the receiver 113, is configured to access an online merchant, such as an online auction merchant, for example, via the network 125 and to offer for sale access to the media file. The media management application 116 enables the user to receive an offer for purchase of access to the media file, accept the offer for purchase, and grant access, or make available access to the purchased media file.

While embodiments have been described as offering for sale access to the media file the via an online auction merchant, it will be appreciated the scope of the embodiments is not so limited, and that the embodiments may also apply to media recording devices that may offer access to the media files via alternate means, such as by an electronic storefront, or agreement via instant message, for example.

Figure 2:
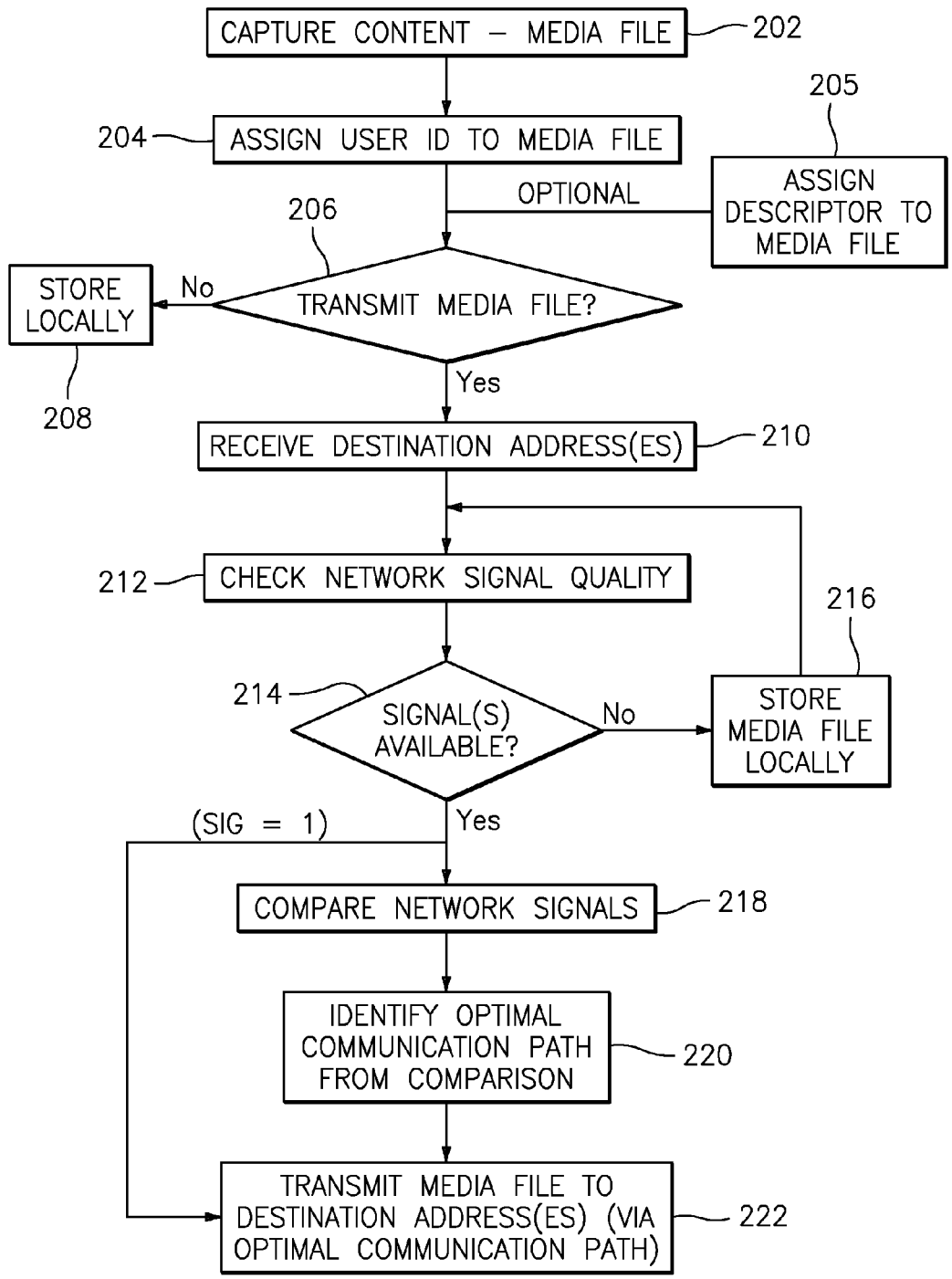
FIG. 2 is a flow diagram describing a process for managing media content by a media recording device in exemplary embodiments.
Figure 4:
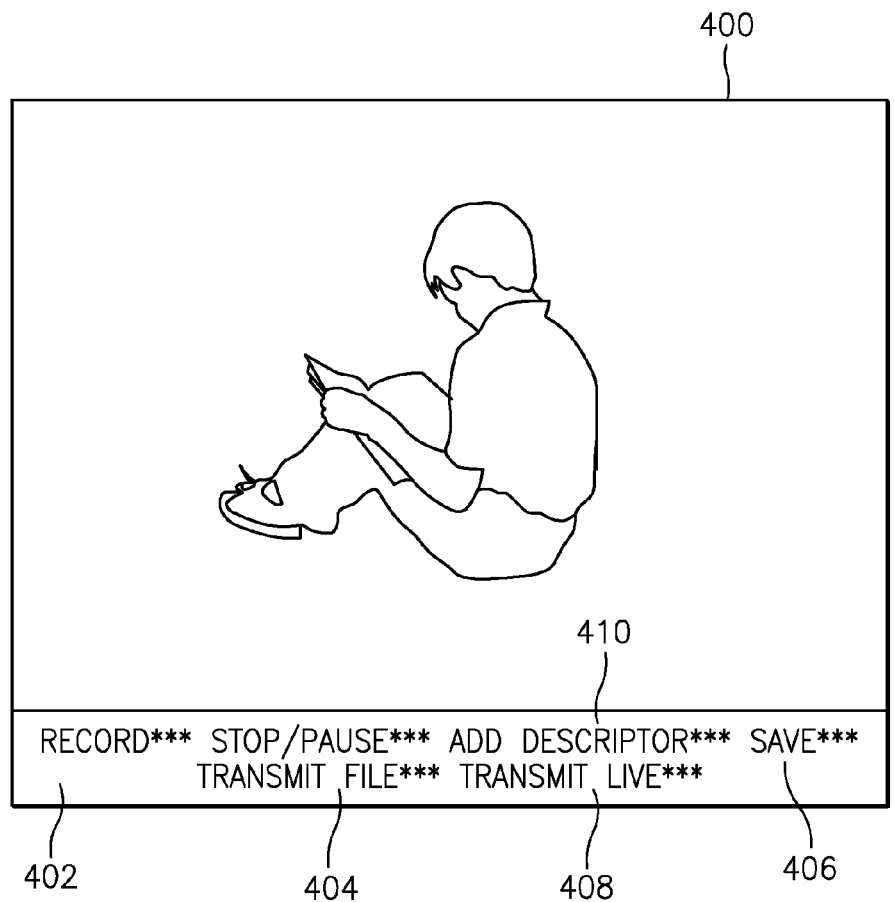
FIG. 4 is a display screen of a media recording device including options for taking action on a media file in exemplary embodiments.

Turning now to FIG. 2, a flow diagram describing a process for managing media content by a media recording device will now be described in exemplary embodiments. At operation 202, a media recording device (e.g., media recording device 110) captures media content (e.g., a live event) via a media recording structure disposed therein. At operation 204, a user identification (ID) is assigned to a media file that comprises the media content. In exemplary embodiments, the media file represents a digitized version of the media content. The user ID specifies an identity of a user of the media recording device 110 (e.g., an individual who is capturing the media content via the media recording device 110). The user ID may be assigned to the media file via, e.g., electronic tag or other structure for associating a media file with additional data elements. The media management application 116 includes a user interface for enabling user inputs to the media recording device 110. The user interface provides selectable options, e.g., on the output component 115, such as a display of the media recording device. A sample display screen is shown in FIG. 4. In exemplary embodiments, a descriptor may be created for the media file at operation 205. The descriptor may be added by selecting an option ADD DESCRIPTOR 410 in window 402 of FIG. 4.

At operation 206, it is determined whether a media file that is stored in storage component 118 of media recording device 110 is to be transmitted, e.g., over network 125. This determination may be made by the user via, e.g., the user interface of media recording device (e.g., input keys, voice commands, etc.). As shown in the display screen 400 of FIG. 4, the user may select the option, TRANSMIT FILE 404 provided in the window 402 of the display screen 400.

In alternative exemplary embodiments, the determination may be made in response to a request from one of receiving devices 150A-150C to access the media file. In either case, if it is determined that the media file will not be transmitted at operation 206, it may be stored in storage device 118 by the user if desired at operation 208 (e.g., by selecting the option SAVE 406 in window 402).

If, however, it is determined that the media file is to be transmitted at operation 206, one or more destination addresses for transmitting the media file are received at operation 210. The destination address includes, e.g., a URL or a similar location-addressable element that identifies a receiving device (e.g., one receiving devices 150A-150C) or a network storage facility (e.g., host system 130).

As indicated above, the media management application 116 may be configured to select an optimum communication path for transmitting the media file. This feature may be implemented, e.g., via the option TRANSMIT FILE 404 or in response to user selected preferences as described further in FIG. 5. If this feature is selected, the signal detection component 119 of the media recording device 110 analyzes the signal strength of any available, or identified, communication paths at operation 212.

At operation 214, the signal detection component 119 determines whether there are any available communication paths. If not, the media file may be stored locally in storage component 118 at operation 216, and the process returns to operation 212 whereby the signal detection component 119 continues to monitor signals from available networks.

At operation 218, if more than one available communication path is determined, the signal quality of each path is compared by the signal detection component 119. From this comparison, an optimal communication path is determined by the signal detection component 119 at operation 220, based upon any one or more of criteria described above with respect to FIG. 1. The media file is then transmitted from the media recording device 110 to the destination address via the optimal communication path at operation 222. Alternatively, if only a single communication path is determined from operation 214, the media file is transmitted at operation 222 via the available communication path.

Figure 3:
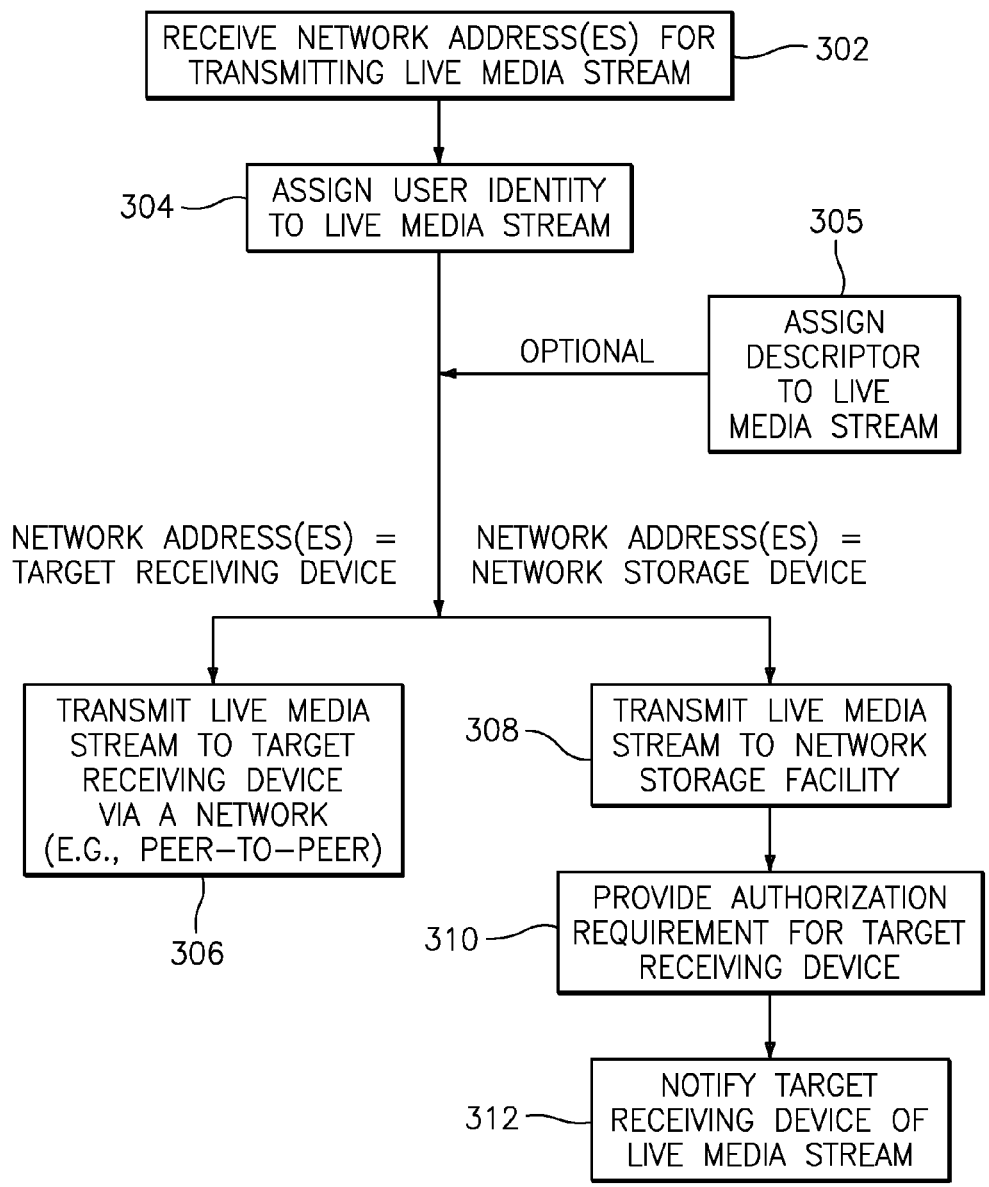
FIG. 3 is a flow diagram describing a process for delivering a live media stream over a network in exemplary embodiments.

As described above with respect to FIG. 1, the media recording device 110 is configured to manage and deliver live media streams captured by the device 110 to designated network elements. Turning now to FIG. 3, a flow diagram describing a process for delivering a live media stream over a network will now be described in exemplary embodiments.

At operation 302, one or more network addresses for transmitting a live media stream are received at the media recording device 110. At operation 304, a user identification (ID) is assigned to the live media stream. The network address and/or user ID may be provided, e.g., via user input to the user interface of media recording device 110 (e.g., via the option TRANSMIT LIVE 408 in the window 402 of FIG. 4, or by entering user preferences in response to a menu of options as described further in FIG. 5).

Figure 8:
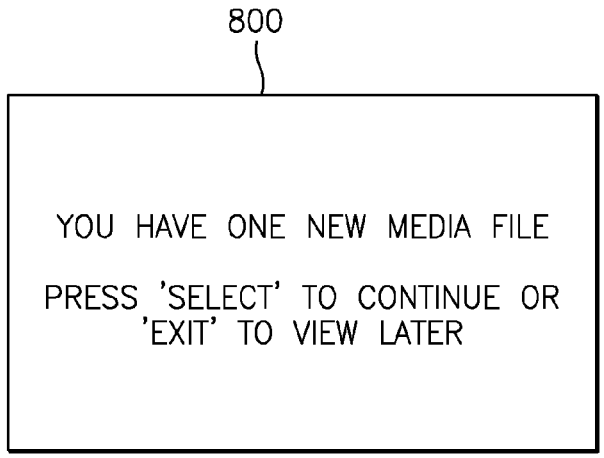
FIG. 8 is a display screen including a sample communication transmitted via the media file management system in exemplary embodiments.

If the network address corresponds to a target receiving device (or final destination device), such as one of receiving devices 150A-150C, the live media stream is transmitted to the target receiving device 150 over a network (e.g., a peer-to-peer network) in near real time at operation 306. If the network address corresponds to a network storage facility (e.g., media services system 105), the live media stream may be transmitted to the network storage facility at operation 308, along with an authorization requirement for providing access to a target receiving device (or final destination device), such as one of receiving devices 150A-150C at operation 310. A notification is generated and transmitted to the target receiving device at operation 312. A sample notification is shown in FIG. 8. As described above, the live media files may be distinguished from the stored media files. This feature is shown and described further in FIG. 9.

Figure 5:
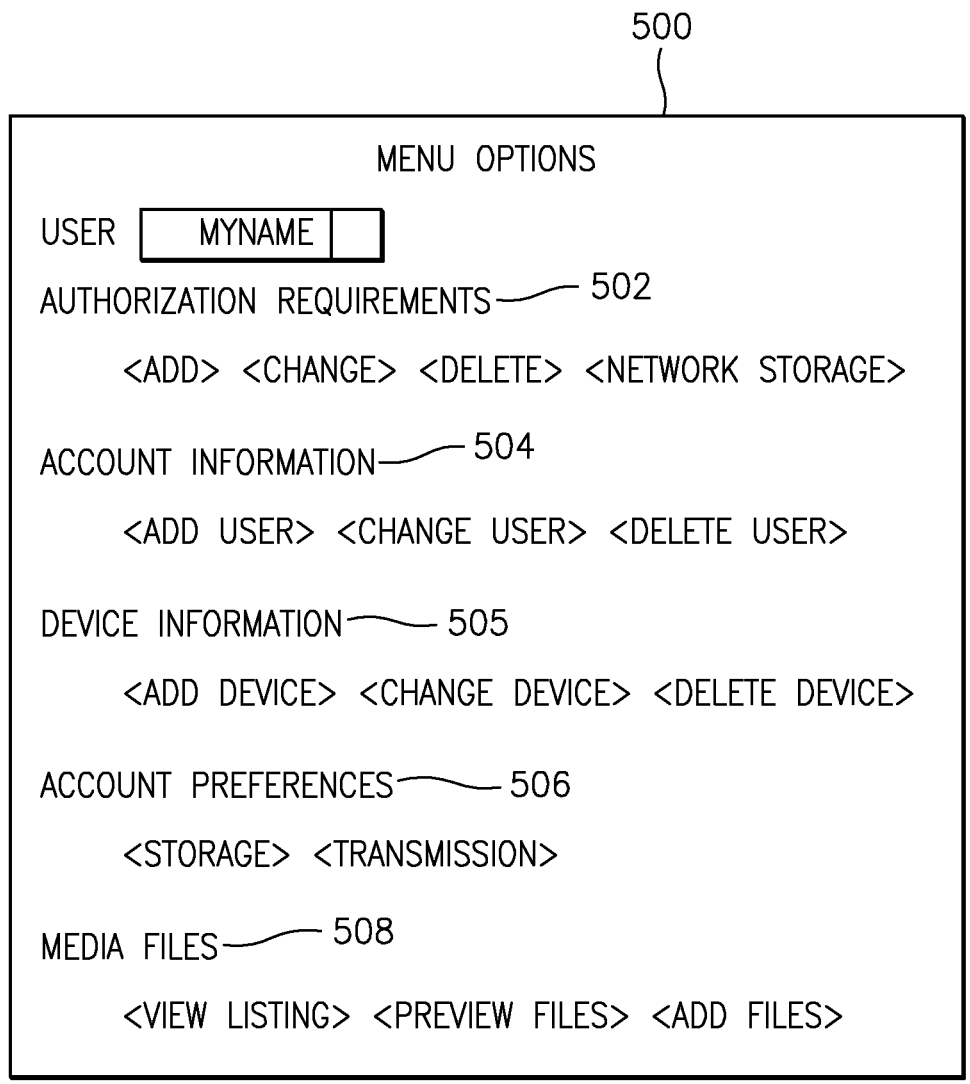
FIG. 5 is a user interface screen depicting menu options for managing media files, accounts, and authorization information in exemplary embodiments.

As indicated above, media management and related services may include providing options for enabling a user of media recording device 110, or authorized individual, to establish preferences with respect to authorization, account management, and storage management. The media management services include a user interface for this purpose as shown in FIG. 5. A user interface screen 500 depicting menu options for managing media files and account information is shown in FIG. 5. The selectable menu options correspond generally to the components 120-126 described above in FIG. 1. The menu options include AUTHORIZATION REQUIREMENTS 502, ACCOUNT INFORMATION 504, DEVICE INFORMATION 505, ACCOUNT PREFERENCES 506, and MEDIA FILES 508. The user interface screen 500 may be presented to the user via, e.g., output component 115 of media recording device 110 or via a Web interface provided to, e.g., one of receiving devices 150A-150C, where the receiving device 150 is under the operation or control of the user. The option, AUTHORIZATION REQUIREMENTS 502 enables a user to add, change, or delete an authorization requirement.

The user may also add, change, or delete users who may be associated with the account to which the user is assigned via the ACCOUNT INFORMATION option 504. Likewise, a user may add, change, or delete devices associated with the account via the DEVICE INFORMATION option 505. In further exemplary embodiments, the user may select storage preferences and transmission preferences via the option, ACCOUNT PREFERENCES 506. The storage preferences may provide instructions for determining the conditions for which an alert regarding available storage may be transmitted as described above with respect to FIG. 1. A sample alert is shown in FIG. 10. The transmission preferences may provide instructions for selecting a communications path for transmitting media files as described above with respect to FIG. 1. The MEDIA FILES option 508 enables a user to view a listing of media files stored locally in storage component 118, stored in storage device 106, or both. In addition, this option 508 enables a user to preview files, e.g., before making a determination to delete a media file from storage device 106. When this option is selected, a portion of a selected media file in the listing may be streamed from the storage device 106 to the media recording device 110. In alternative exemplary embodiments, a portion of each media file may be stored locally in storage component 118 and presented upon selection.

Figure 6:
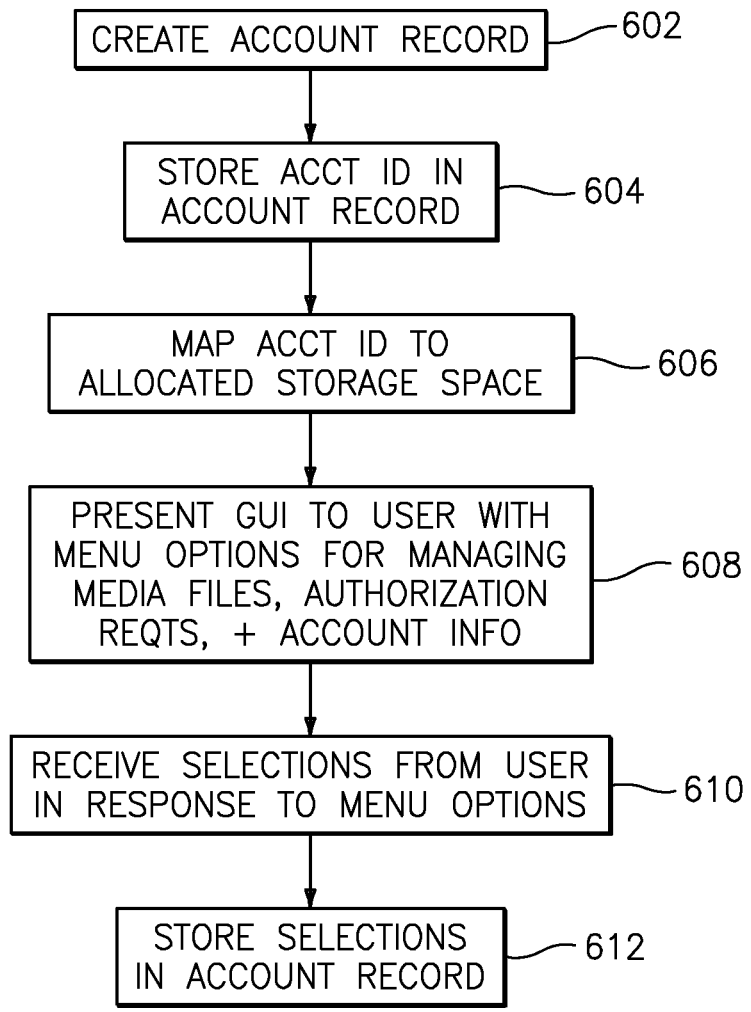
FIG. 6 is a flow diagram describing a process for providing centralized media management services in exemplary embodiments.

As indicated above, media services system 105 provides centralized media management services to account members (e.g., a user of media recording device 110). Turning now to FIG. 6, a flow diagram describing a process for providing centralized media management services will now be described in exemplary embodiments.

Figure 7:
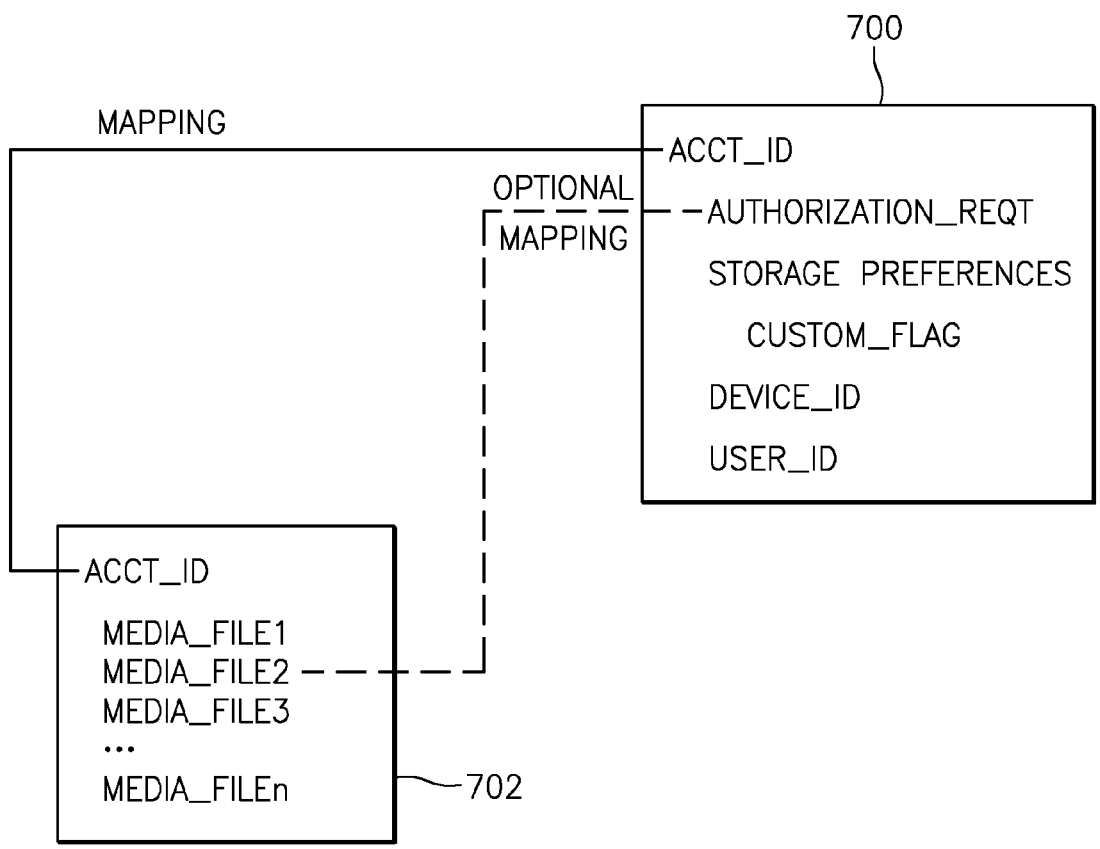
FIG. 7 is a sample account record and media file directory created via the media file management system in exemplary embodiments.

A new account is initiated upon a request by an individual to receive the media services via the account management component 120 of the media services application 103. At operation 602, an account record is created for the individual (e.g., user of media recording device 110). A sample account record and media file directory are shown and described in FIG. 7. An account identification (ID) is stored in the account record at operation 604. The account ID differentiates the account from other accounts serviced by the media services system 105. A user ID may be generated for the account as well. The user ID differentiates the user from other users within the same account. At operation 606, the account ID is mapped to storage space via a media file directory allocated in storage device 106 for the account. As shown in FIG. 7, for example, the account ID of the account record 700 is used as a key for mapping the account with the allocated storage space via media file directory 702. In alternative exemplary embodiments, a user may request that an authorization requirement established for a particular target receiving device 150 and/or user be mapped to specified media files stored in the allocated storage space of storage device 106. This optional mapping is shown in FIG. 7 for purposes of illustration.

At operation 608, a user interface is presented to the user with menu options for managing accounts, devices, media files, and authorization settings. The menu options may be presented, e.g., via the user interface screen 500 shown in FIG. 5. At operation 610, selections entered by the user are received and the selections are stored in the account record 700 at operation 612.

As indicated above, a target receiving device (e.g., one of receiving devices 150A-150C) may be presented with a notification of a new media file to which the receiving device 150 has been identified in the authorization requirement (e.g., via the communication shown in display screen 800 of FIG. 8) or may request access to a media file via an input component of the receiving device 150. Upon successful authorization of the receiving device 150 by the host system 130 via, e.g., the authorization component 126, a library or listing of media files associated with the authorization requirement and receiving device 150 may be presented to a user of the receiving device 150. A sample media file library is shown in FIG. 9.

Figure 9:
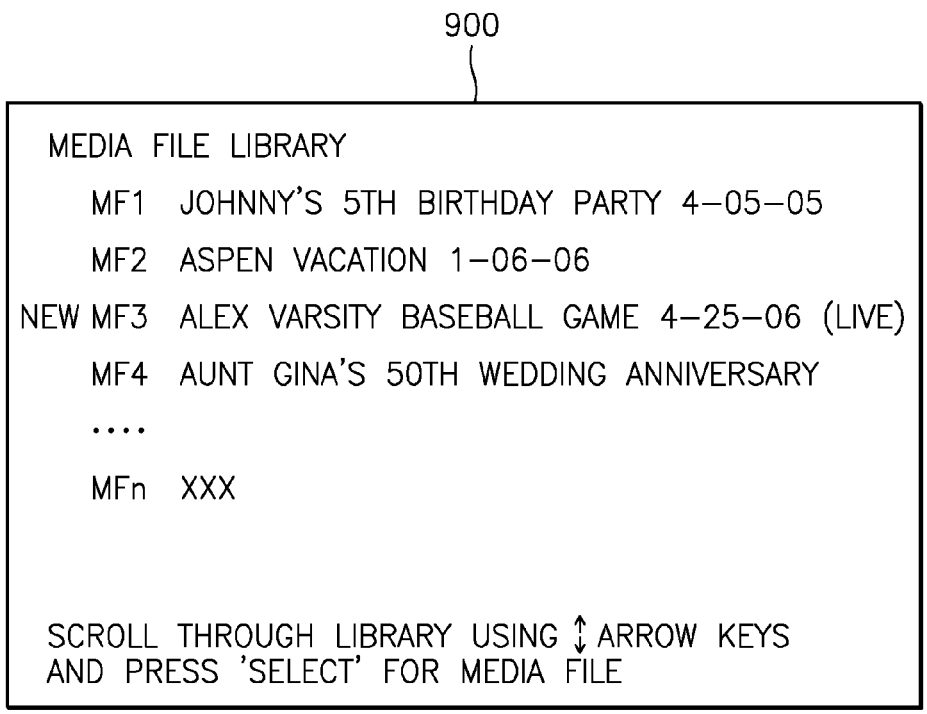
FIG. 9 is a display screen depicting a sample media file library and options provided by the media file management system in exemplary embodiments.

Turning now to FIG. 9, a display screen 900 depicting a sample media file library and options provided by the media file management system 100 will now be described in exemplary embodiments. The media file library lists media files MF1-MFn associated with the receiving device 150. As indicated above, the live media files may be distinguished from the stored media files by ways, such as color, symbol, brightness, audio signal, etc. As shown in the display screen 900 of FIG. 9, a live media file is distinguished by the element (LIVE) following the descriptor, ALEX VARSITY BASEBALL GAME 4-25-06. The display screen 900 also includes instructions for guiding a user through the library.

As indicated above, a user may select preferences establishing conditions upon which a storage alert may be transmitted. A display screen 1000 depicting a sample notification and related options provided by the media file management system is shown in FIG. 10. A user may select from the available options as shown in display screen 1000 and as described above with respect to FIG. 1.

As described above, the exemplary embodiments can be in the form of computer-implemented processes and apparatuses for practicing those processes. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the exemplary embodiments. The exemplary embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an apparatus for practicing the exemplary embodiments. When implemented on a general-purpose microprocessor, the computer program code segments execute specific microprocessor machine instructions. The computer program product code could also be implemented using electronic logic circuits or a microchip.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for providing media management services, comprising:
creating a first account that includes an account record for a first user of the media management services;
allocating a first storage space to the first user that is accessible to the first user via user credentials assigned to the first user;
storing media files received from the first user, the media files stored in the first storage space;
creating a second account that includes an account record for a second user of the media management services;
allocating a second storage space to the second user that is accessible to the second user via user credentials assigned to the second user;
sharing the second storage space with the first user based on a device identifier of a media recording device that is common to both the first account record and the second account record;
for each media file in a subset of the media files identified by the first user, receiving an authorization requirement and an access code from the first user, the authorization requirement and the access code configured to validate each of a group of target viewers before providing the group of target viewers with access to corresponding media files in the subset, the group of target viewers received from the first user;
receiving a request from the target viewer to view a media file;
creating a listing of the media files in the first storage space that comprise the subset, the media files including at least one live media stream captured by the media recording device;
presenting the listing to the target viewer; and
differentiating the live media stream from stored media files in the listing via visual contrast and an audio element.

2. The method of claim 1, further comprising:
mapping a user identification of the first user to the first account record, the user identification received from the media recording device; and
storing a media file generated by the media recording device in the first storage space based on the user identification.

3. The method of claim 2, wherein
the authorization requirement includes an identity of the target viewer; and
wherein upon successful validation of the access code, and in response to a request from the target viewer to access the media file, the method includes permitting access to the media file for the target viewer.

4. The method of claim 1, further comprising:
storing a media file generated by the media recording device in the first storage space; and
receiving a media descriptor for the media file, the media descriptor providing descriptive information relating to the media file.

5. The method of claim 1, further comprising:
defining conditions for generating an alert in response to storage space consumed for the first storage space and the second storage space; and
transmitting the alert to the first user and the second user when one of the conditions is met.

6. A system for providing media management services, comprising:
memory comprising computer-executable instructions; and
a processor executing the computer-executable instructions, the computer-executable instructions, when executed by the processor, cause the processor to perform operations comprising:

creating a first account that includes an account record for a first user of the media management services;

allocating a first storage space to the first user that is accessible to the first user via user credentials assigned to the first user;

storing media files received from the first user, the media files stored in the first storage space;

creating a second account that includes an account record for a second user of the media management services;

allocating a second storage space to the second user that is accessible to the second user via user credentials assigned to the second user;

sharing the second storage space with the first user based on a device identifier of a media recording device that is common to both the first account record and the second account record;

for each media file in a subset of the media files identified by the first user, receiving an authorization requirement and an access code from the first user, the authorization requirement and the access code configured to validate each of a group of target viewers before providing the group of target viewers with access to corresponding media files in the subset, the group of target viewers received from the first user;

receiving a request from the target viewer to view a media file;

creating a listing of the media files in the first storage space that comprise the subset, the media files including at least one live media stream captured by the media recording device;

presenting the listing to the target viewer; and differentiating the live media stream from stored media files in the listing via visual contrast and an audio element.

7. The system of claim 6, wherein the operations further comprise:

mapping a user identification of the first user to the first account record, the user identification received from the media recording device; and storing a media file generated by the media recording device in the first storage space based on the user identification.

8. The system of claim 7, wherein the authorization requirement includes an identity of the target viewer; and wherein upon successful validation of the access code, and in response to a request from the target viewer to access the media file, the operations further comprise permitting access to the media file for the target viewer.

9. The system of claim 6, wherein the operations further comprise:

storing a media file generated by the media recording device in the first storage space; and receiving a media descriptor for the media file, the media descriptor providing descriptive information relating to the media file.

10. The system of claim 6, wherein the operations further comprise:

defining conditions for generating an alert in response to storage space consumed for the first storage space and the second storage space; and transmitting the alert to the first user and the second user when one of the conditions is met.

11. A computer program product for providing media management services, the computer program product comprising a non-transitory storage medium embodied with machine-readable computer program code, which when executed by a computer, causes the computer to:

create a first account comprising an account record for a first user of the media management services;

allocate a first storage space to the first user that is accessible to the first user via user credentials assigned to the first user;

store media files received from the first user, the media files stored in the first storage space;

create a second account comprising an account record for a second user of the media management services;

allocate a second storage space to the second user that is accessible to the second user via user credentials assigned to the second user;

share the second storage space with the first user based on a device identifier of a media recording device that is common to both the first account record and the second account record;

for each media file in a subset of the media files identified by the first user, receive an authorization requirement and an access code from the first user, the authorization requirement and the access code configured to validate each of a group of target viewers before providing the group of target viewers with access to corresponding media files in the subset, the group of target viewers received from the first user;

receive a request from the target viewer to view a media file;

create a listing of the media files in the first storage space that comprise the subset, the media files including at least one live media stream captured by the media recording device;

present the listing to the target viewer; and differentiate the live media stream from stored media files in the listing via visual contrast and an audio element.

12. The computer program product of claim 11, wherein the machine-readable computer program code further causes the computer to:

mapping a user identification of the first user to the first account record, the user identification received from the media recording device; and storing a media file generated by the media recording device in the first storage space based on the user identification.

13. The computer program product of claim 12, wherein the authorization requirement includes an identity of the target viewer; and wherein upon successful validation of the access code, and in response to a request from the target viewer to access the media file, the machine-readable computer program code further causes the computer to permit access to the media file for the target viewer.

14. The computer program product of claim 11, wherein the machine-readable computer program code further causes the computer to:

storing a media file generated by the media recording device in the first storage space; and receiving a media descriptor for the media file, the media descriptor providing descriptive information relating to the media file.

* * * * *